United States Patent
Wigsten et al.

(10) Patent No.: US 6,736,744 B1
(45) Date of Patent: May 18, 2004

(54) ROLLER CHAIN SPROCKET FOR PREVENTING SUBSTANTIALLY RADIAL IMPACT WITH CHAIN ROLLERS

(75) Inventors: Mark MacDonald Wigsten, Lansing, NY (US); George L. Markley, Montour Falls, NY (US)

(73) Assignee: BorgWarner, Inc., Auburn Hills, MI (US)

( * ) Notice: Subject to any disclaimer, the term of this patent is extended or adjusted under 35 U.S.C. 154(b) by 0 days.

(21) Appl. No.: 09/704,014

(22) Filed: Nov. 1, 2000

(51) Int. Cl.[7] .............................. F16H 55/30
(52) U.S. Cl. ........................ 474/152; 474/202
(58) Field of Search ............... 474/148, 152, 474/156, 160, 202, 203, 204, 205, 206

(56) References Cited

U.S. PATENT DOCUMENTS

| | | | |
|---|---|---|---|
| 2,667,792 A | * 2/1954 | Bendall .................... 474/156 |
| 3,448,629 A | 6/1969 | Pfrank et al. ................ 74/229 |
| 4,116,081 A | * 9/1978 | Luttrell et al. ............ 74/243 R |
| RE30,018 E | * 6/1979 | Clemens et al. ........... 74/243 R |
| 4,738,653 A | * 4/1988 | Riewerts et al. ............ 474/156 |
| 5,192,252 A | * 3/1993 | Skurka et al. ............... 474/210 |
| 5,397,278 A | 3/1995 | Suzuki et al. ............... 474/156 |
| 5,419,743 A | * 5/1995 | Takeda et al. ............... 474/157 |
| 5,876,295 A | 3/1999 | Young ......................... 474/156 |
| 5,921,877 A | 7/1999 | Suzuki ........................ 474/156 |
| 5,921,878 A | 7/1999 | Young ......................... 474/160 |
| 5,993,344 A | 11/1999 | Young ......................... 474/160 |
| 5,997,424 A | 12/1999 | Young ......................... 474/156 |
| 6,030,306 A | 2/2000 | Young ......................... 474/111 |
| 6,036,614 A | * 3/2000 | Baddaria ..................... 474/155 |
| 6,179,741 B1 | * 1/2001 | Young ......................... 474/161 |

* cited by examiner

Primary Examiner—Thomas R. Hannon
Assistant Examiner—Vicky A. Johnson
(74) Attorney, Agent, or Firm—McAndrews, Held & Malloy, Ltd.; Greg Dziegielewski

(57) ABSTRACT

A sprocket is disclosed for use with a roller chain and that substantially avoids radial impact of chain rollers with the sprocket. The sprocket differs from prior sprockets in that the tooth root radius of the sprocket is increased while the sprocket pitch circle diameter is maintained. This configuration creates a clearance between the roller and the tooth root. This clearance allows rollers of a chain of like pitch to impact the sprocket teeth in a substantially tangential fashion on their flanks, rather than substantially radially on the tooth root.

5 Claims, 2 Drawing Sheets

ROLLER CHAIN SPROCKET FOR PREVENTING SUBSTANTIALLY RADIAL IMPACT WITH CHAIN ROLLERS

BACKGROUND OF THE INVENTION

The present invention relates to a sprocket for a roller chain. FIG. 1 shows both a chain C having rollers R engaging sprockets S1 and S2. In particular, the present invention relates to a sprocket that reduces the noise generated when the roller chain and sprocket mesh.

Noise generated by a roller chain meshing with a sprocket is a long recognized problem. One of the most significant sources of noise in a typical roller chain drive results from the repeated impacts between the rollers and the sprockets as the rollers seat between the teeth of the sprocket. As shown in FIG. 2, a roller 10 engaging a sprocket S swings on an arc 20 having a radius equal to the chain pitch P around the center of a seated adjacent roller 30. The roller 10 swings along the arc to make a substantially radial impact with the sprocket tooth root 40.

The prior art discloses attempts to reduce the noise created by rollers impacting a sprocket. One such attempt to reduce the noise levels generated by roller and sprocket collisions is shown in U.S. Pat. No. 6,030,306. This patent discloses a technique that staggers the chain meshing with multiple sprockets such that the overall noise level generated by the multiple sprocket collisions is reduced. However, this method does not avoid substantially radial collisions or reduce the noise generated by collisions between the rollers and individual sprocket tooth roots.

Other sprocket designs have attempted to decrease the impact noise of roller chain drives by altering the sprocket tooth profile. An early example of such a design is disclosed by U.S. Pat. No. 3,448,629. This patent describes modifying the bottom diameter of the sprockets, widening the gap between adjacent teeth of the sprockets, and attaching one or more rubber rings near the outer periphery of each sprocket.

A more recent attempt to reduce roller chain and sprocket noise using a modified sprocket tooth profile is described by U.S. Pat. No. 5,921,877. A sprocket tooth profile having three sections is described as making the roller of a chain come into engagement with the teeth of the sprocket without generating a large noise. However, this design is limited to a unidirectional roller chain drive because of the asymmetry of the tooth profile as generally shown by FIG. 3.

Other designs also utilized an asymmetrical tooth design in an effort to reduce the noise generated by the impact of the rollers as they strike the sprocket. U.S. Pat. No. 5,876,295 discloses an asymmetrical tooth profile with flank radii that may differ from the drive side to the coast side of the tooth. U.S. Pat. Nos. 5,921,878 and 5,993,344 disclose an asymmetrical tooth profile that incorporates a flank flat that is tangential to an engaging flank radius and a first root radius, and a pitch mismatch wherein the sprocket chordal pitch is less than the chain chordal pitch. This arrangement is described as facilitating a staged roller tooth contact with the sprocket. Again, the asymmetry of the tooth profile mandates a unidirectional roller chain drive system.

Other asymmetrical tooth designs, such as that disclosed by U.S. Pat. No. 5,997,424, provide a tooth space clearance between the roller and a portion of the tooth root in an attempt to reduce the noise generated by the vibrational contact of unseated rollers with the sprocket teeth as the rollers wear. FIG. 4 illustrates one such design. Instead of impacting the bottom of the tooth root, the roller makes radial contact with the flanks of adjacent teeth at locations A1 and A2 while bridging over the bottom of the tooth root. This sprocket is also designed for a unidirectional roller chain drive system. Similarly, U.S. Pat. No. 5,397,278 simply reduces the gap between adjacent sprocket teeth such that the roller makes simultaneous radial contact with the flanks of adjacent teeth. However, this design does allow for use in a multi-directional roller chain drive system.

There remains a long-standing need for a multi-directional sprocket that substantially minimizes the noise generated by the substantially radial impacts between the rollers of a roller chain and a sprocket. The present invention addresses this need as well as others previous disadvantages of the prior art.

BRIEF SUMMARY OF THE INVENTION

A sprocket according to the present invention is a multi-directional roller chain sprocket that minimizes substantially radial roller impact with the sprocket. This sprocket provides a tooth root-to-chain pitch relationship that causes a substantially tangential impact between the roller and the sprocket tooth flank to smoothly and quietly transmit the connecting energy of the chain and sprocket. A related feature of a sprocket according to the present invention is distribution of the connecting energy of the roller and sprocket over time to avoid impact energy related noise.

In one embodiment, a known roller chain is selected to match the pitch of the sprocket. The roller chain has a plurality of links, interconnected by pivot pins. A roller member that is freely rotatable about the pivot pin is mounted on each pivot pin. The roller members have a cylindrical outer surface and are characterized by a tolerance stack that represents the variation of the diameter of the outer cylindrical surface between the largest and smallest diameters of roller members. The roller chain is constructed to engage a sprocket having a plurality of teeth spaced about its periphery. The sprocket has a pitch circle passing through the center of each roller member when those members are fully engaged with the sprocket.

The sprocket defines generally circular roots between pairs of adjacent teeth. Each of the roots is defined by a tooth root radius, which is the distance from a point on the root to a point on the sprocket pitch circle centered between the teeth adjacent to the root. The tooth root radius is determined to minimize substantially radial impacts of the roller members with the sprocket. The roller members engage the sprocket teeth on their flanks in a glancing, or substantially tangential fashion. The sprocket may have tooth root radii equal to the roller radius, the radius of the outer cylindrical surface of the roller, plus the tolerance stack between the roller members and the chordal rise and fall of the chain. However, a lesser tooth root radius may suffice.

These and other features of the present sprocket will become apparent from the present drawings and specification.

DETAILED DESCRIPTION OF THE INVENTION

Figure 1:
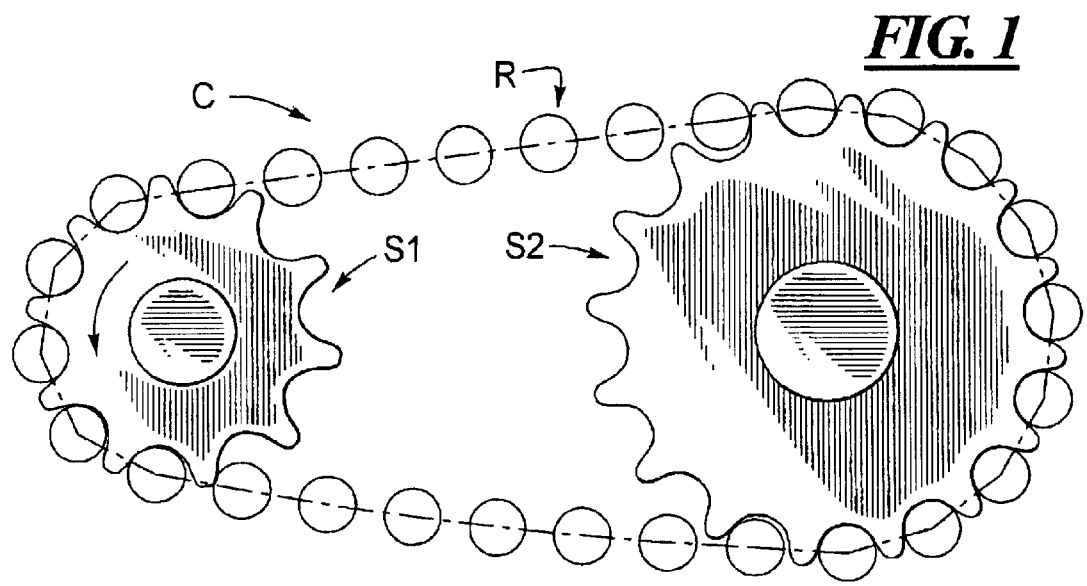
FIG. 1 illustrates a typical roller chain and sprocket drive system.
Figure 2:
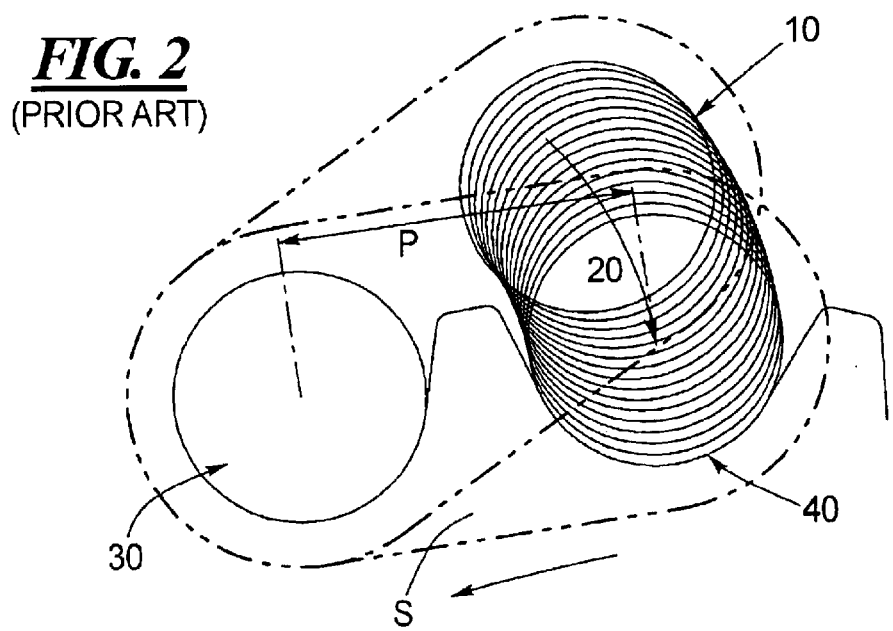
FIG. 2 illustrates the substantially radial meshing of a chain roller with a conventional sprocket.
Figure 3:
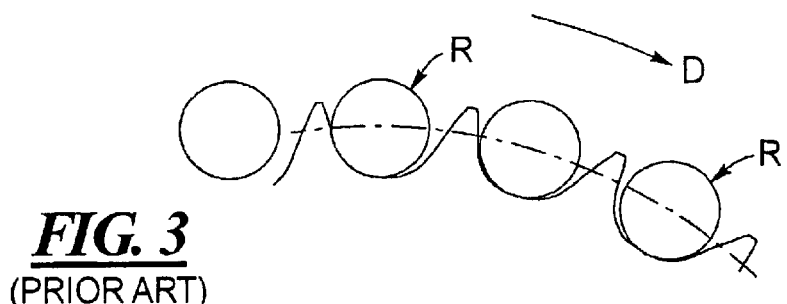
FIG. 3 illustrates a prior art asymmetrical sprocket tooth profile.
Figure 4:
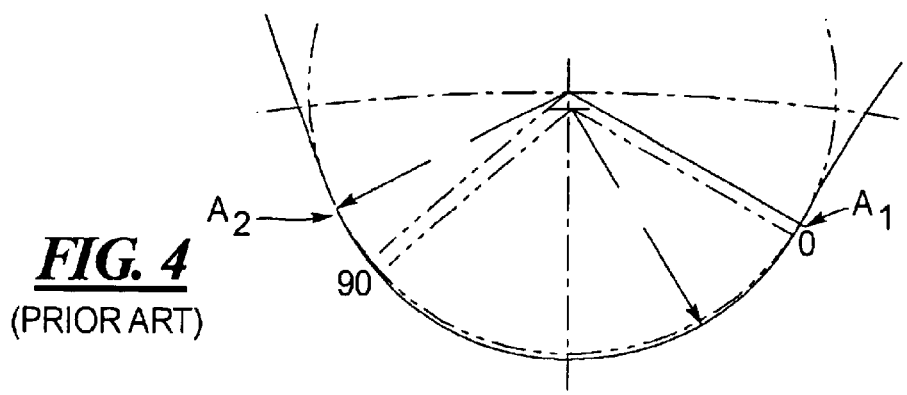
FIG. 4 illustrates the two point contact between the chain roller and a prior art root relieved asymmetrical tooth profile sprocket.
Figure 5:
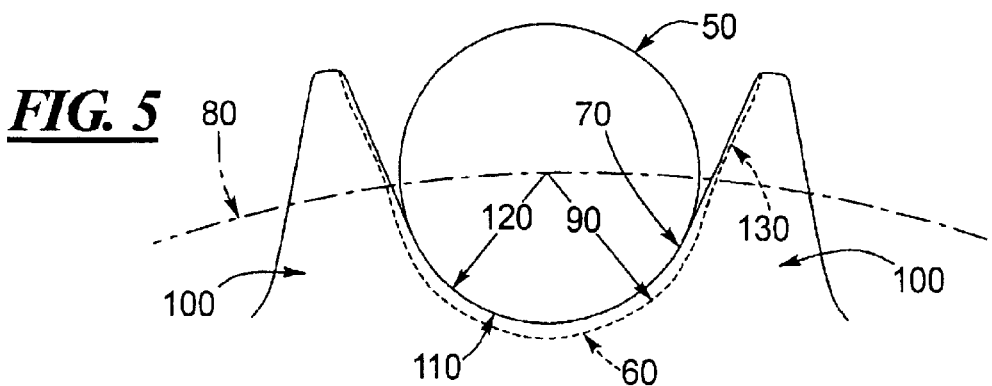
FIG. 5 illustrates a roller member and sprocket tooth profile according to the present invention as modified from a conventional sprocket tooth profile.

Roller chain rollers seat substantially radially in the tooth root of a conventional sprocket by a motion that can be visualized as the sprocket being held stationary and a taut chain being wrapped around the sprocket. That motion is shown by FIG. 2. FIG. 5 shows a chain roller member 50 in a position at which it seats in the root 110 of a conventional sprocket profile 70. A sprocket according to the present invention improves upon such known sprockets by minimizing any substantially radial impact of the chain roller member 50 with, or bridging impact over, the sprocket tooth root 60 according to the present invention. This in turn substantially eliminates a significant source of noise associated with roller chain sprockets.

This improvement is realized by increasing the radius 120 of the tooth root 110 of a conventional sprocket profile 70, while maintaining the original sprocket pitch circle 80. The increased tooth root radius 90 causes the sprocket teeth 100 to be narrower and the root 60 to be deeper than the original root 110. As a result, the roller member 50 positioned at the pitch circle 80 is not in contact with the tooth root 60. A clearance is created between the roller member 50 and the tooth root 60. This clearance is approximately equivalent to the difference between the radius 120 of the conventional root, which is substantially equal to the radius of roller member 50, and the increased tooth root radius 90. The clearance minimizes the radial impact of the roller member 50 and the tooth root 60. Instead, the roller 50 will make a substantially tangential contact with the modified tooth flank 130 to smoothly engage the sprocket in a glancing fashion.

Figure 6:
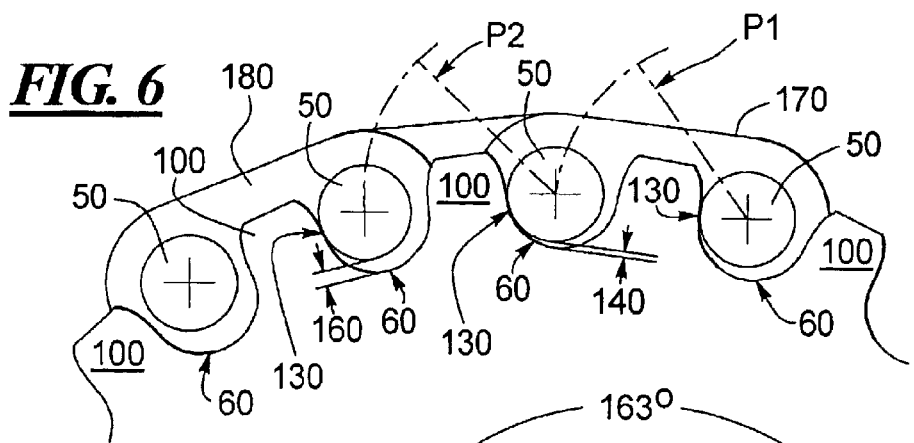
FIG. 6 illustrates the roller members of a chain engaging a sprocket according to the present invention.

FIG. 6 illustrates the roller member clearance 140 and substantially tangential contact of roller member 50 with the improved sprocket tooth flank 130 as the roller members 50 engage the improved sprocket teeth 100. As shown, when the sprocket rotates the roller members 50 are captured as they come into substantially tangential contact with the tooth flank 130. Thus, each roller member 50 will gently roll into contact with a sprocket tooth flank 130 rather than harshly impacting the tooth root 60 in a substantially radial fashion. This rolling engagement also absorbs the engagement energy of the sprocket tooth 100 and roller member 50 collisions over a longer time frame as compared to a conventional sprocket. There is also a clearance between the engaged roller members 50 and the trailing adjacent tooth flank 130, increasing the backlash of the system.

The resulting clearance created between the roller member 50 and the tooth root 60 should be sufficient to prevent substantially radial roller member contact with the sprocket. The sum distance of the tolerance stack between rollers and the chordal rise and fall of the chain clearance is a good guideline, although less clearance may be sufficient. Chordal rise and fall is defined as the distance from the center of the sprocket to the centerline of the chain that is perpendicular to the centerline of the sprocket when a chain roller member 50 is on the sprocket centerline versus when two roller members 50 are equally spaced about the sprocket centerline. This value, or radial difference, varies with the chain and/or sprocket pitch.

As also shown by FIG. 6, the pitch of the chain may be varied. Roller members 50 located a pitch distance P1 from the adjacent roller member 50 attached to the link 170 engages a tooth 100 leaving a clearance 140 from the tooth root 60. A larger pitch distance P2 of link 180 causes a roller member 50 to engage a tooth 100 at a location that is separated a greater distance 160 from the tooth root 60.

Figure 7:
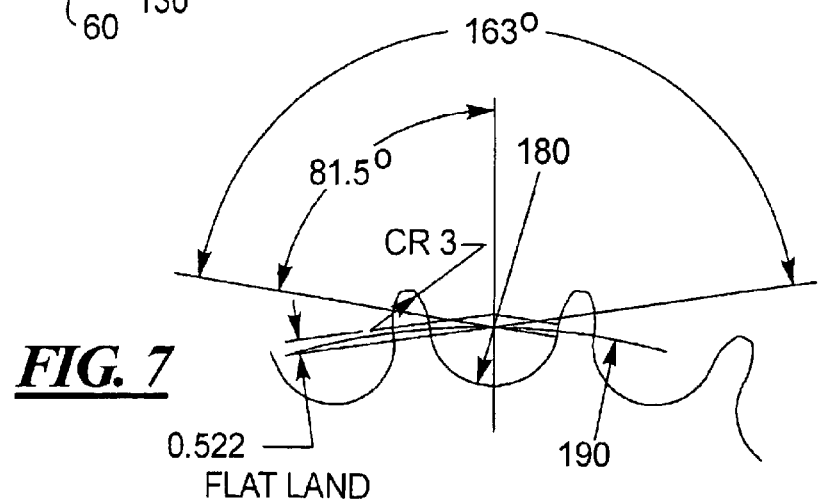
FIG. 7 illustrates a sprocket according to an embodiment of the present invention that is constructed for use with an 8 mm true roller chain.

The dimensions in FIG. 7 illustrate one embodiment of 24 tooth sprocket according to the present invention for use with an 8 mm true roller chain. In this embodiment, the tooth root radius dimension 180 is 3.0885 mm which is oversized while the pitch diameter of the sprocket 190 is maintained at 61.2904 mm in accord with the selected chain pitch.

While the invention has been described with reference to preferred embodiments, those skilled in the art will understand that various changes may be made and equivalents may be substituted without departing from the scope of the invention. In addition, many modifications may be made to adapt a particular step, structure, or material to the teachings of the invention without departing from its scope. Therefore, it is intended that the invention not be limited to the particular embodiments disclosed, but that the invention will include all embodiments falling within the scope of the appended claims.

What is claimed is:

1. A sprocket for use with a roller chain having roller members of a pre-selected radius and located with centers at a chain pitch distance apart, the sprocket having a sprocket pitch circle corresponding to the pre-selected roller chain pitch and comprising:

a plurality of teeth spaced about an outer periphery of said sprocket;

roots defined by the sprocket between adjacent teeth, each of said roots defining an arc joining adjacent teeth and having a tooth root radius equal to the distance from said root to a point on the sprocket pitch circle substantially centered between teeth adjacent to the root, said tooth root radius being larger than said pre-selected radius of said roller members by at least approximately chordal rise and fall of the chain on the sprocket whereby radial impact between said roller members and said sprocket is substantially prevented and the roller members do not contact the root when seated on the sprocket in driving contact.

2. The sprocket of claim 1, wherein the tooth root radius is substantially equal to the roller radius plus the tolerance stack between said roller members and the chordal rise and fall of said roller chain.

3. A roller chain and sprocket assembly comprising:

a roller chain having a pre-selected pitch and roller members of a pre-selected radius; and a sprocket having a sprocket pitch circle corresponding to said pre-selected roller chain pitch, said sprocket defining a plurality of teeth spaced about an outer periphery of said sprocket, and defining roots located between adjacent teeth, each of said roots characterized by a tooth root radius representing the distance from the root to a point on the sprocket pitch circle that is substantially centered between teeth adjacent to said root, said tooth root radius being larger than said pre-selected radius of said roller members by at least approximately chordal rise and fall of the chain on the sprocket whereby radial impact between said roller members and said sprocket is substantially prevented and the roller members do not contact the sprocket root when seated on the sprocket in driving contact.

4. The roller chain and sprocket assembly of claim 3, wherein said tooth root radius is substantially equivalent to the roller radius plus the tolerance stack between said roller members and the chordal rise and fall of said roller chain.

5. A roller chain and sprocket assembly comprising:

a roller chain having a series of links, the series alternately having first links and second links rotatably joined to each other by pins near opposed ends of the links, the first links having a first pitch, and the second links having a second pitch that is greater than the first pitch, said first links and second links having roller members mounted on the pins and having a generally cylindrical outer surface defined by a roller radius; and a sprocket having a sprocket pitch circle corresponding to said first pitch, said sprocket defining a plurality of teeth spaced about an outer periphery of said sprocket, and defining roots located between adjacent teeth, each of said roots characterized by a tooth root radius representing the distance from the root to a point on the sprocket pitch circle that is substantially centered between teeth adjacent to said root, said tooth root radius being larger than said roller radius by at least approximately chordal rise and fall of the chain on the sprocket whereby radial impact between said roller members and said sprocket is substantially prevented and the roller members do not contact the sprocket root when seated on the sprocket in driving contact.

* * * * *